(12) United States Patent
Mercure

(10) Patent No.: US 7,878,754 B2
(45) Date of Patent: Feb. 1, 2011

(54) STORAGE SYSTEM FOR GLASS OFFCUT

(75) Inventor: Roger Mercure, Mascouche (CA)

(73) Assignee: Bromer Inc., Terrebonne, Quebec (CA)

( * ) Notice: Subject to any disclaimer, the term of this patent is extended or adjusted under 35 U.S.C. 154(b) by 888 days.

(21) Appl. No.: 11/734,470

(22) Filed: Apr. 12, 2007

(65) Prior Publication Data

US 2007/0190898 A1 Aug. 16, 2007

Related U.S. Application Data

(63) Continuation-in-part of application No. 10/798,326, filed on Mar. 12, 2004, now Pat. No. 7,217,077.

(30) Foreign Application Priority Data

Mar. 13, 2003 (CA) .................................. 2421121

(51) Int. Cl.
B65G 47/84 (2006.01)
(52) U.S. Cl. ..................................... 414/801
(58) Field of Classification Search ................. 414/398, 414/801, 805, 921; 225/2
See application file for complete search history.

(56) References Cited

U.S. PATENT DOCUMENTS

| | | | |
|---|---|---|---|
| 2,865,513 A | 12/1958 | Allen | |
| 2,884,136 A | 4/1959 | Leighton | |
| 2,902,168 A | 9/1959 | Allen, Jr. | |
| 3,279,664 A | 10/1966 | Lynch | |
| 3,589,525 A | 6/1971 | Allen | |
| RE28,609 E | * 11/1975 | Malburet | ................. 414/736 |
| 4,109,805 A | 8/1978 | Wagner | |
| 4,135,655 A | 1/1979 | Brown | |
| 4,750,854 A | 6/1988 | Pascale et al. | |
| 4,815,395 A | 3/1989 | Trueg | |
| 5,024,576 A | 6/1991 | Meschi | |
| 5,209,627 A | 5/1993 | Lisec | |
| 5,375,959 A | 12/1994 | Trento | |
| 5,505,574 A | 4/1996 | Piazza | |
| 5,511,671 A | 4/1996 | Zumstein | |
| 5,542,805 A | 8/1996 | Lisec | |
| 5,641,076 A | 6/1997 | Englund | |
| 5,873,922 A | 2/1999 | Lisec | |
| 5,906,282 A | 5/1999 | Aldrich et al. | |

(Continued)

FOREIGN PATENT DOCUMENTS

DE 3934967 4/1991

(Continued)

*Primary Examiner*—Charles A Fox
(74) *Attorney, Agent, or Firm*—Ogilvy Renault LLP

(57) ABSTRACT

The storage system is for use next to a glass processing line having a loading table, a glass cutting table and a breakout table. The storage system comprises a first tilt table and a second tilt table with an intermediary conveyor extending between them. A storage rack and a laterally-movable conveyor are positioned at either ends of the storage system. The storage rack comprises a plurality of parallel storage slots. The storage slots store the glass offcuts at a substantially vertical position of less than 90 degrees with reference to the horizontal. A method of storing a glass offcut and a method of recycling glass offcuts are also disclosed. The storage system and methods allow to easily store and retrieve glass offcuts.

5 Claims, 11 Drawing Sheets

U.S. PATENT DOCUMENTS

| | | |
|---|---|---|
| 6,247,601 B1 | 6/2001 | Norton et al. |
| 6,382,897 B2 | 5/2002 | Mattio et al. |
| 6,510,950 B1 | 1/2003 | Piazza |
| 6,659,265 B2 | 12/2003 | Pfeilschifter et al. |
| 7,025,053 B1 | 4/2006 | Altamirano |
| 7,155,938 B2 | 1/2007 | Honegger et al. |
| 7,217,077 B2 | 5/2007 | Mercure |
| 2002/0005332 A1 | 1/2002 | Piazza |
| 2003/0127484 A1* | 7/2003 | Wirsam .................. 225/2 |
| 2005/0103055 A1 | 5/2005 | Gfeller et al. |
| 2005/0276680 A1 | 12/2005 | Chen et al. |

FOREIGN PATENT DOCUMENTS

| | | |
|---|---|---|
| DE | 19600348 A1 | 7/1997 |
| DE | 19636470 | 3/1998 |
| DE | 19821677 | 11/1999 |
| EP | 0032866 | 7/1981 |
| EP | 0048334 | 3/1982 |
| EP | 0673890 | 9/1995 |
| EP | 0749916 | 12/1996 |
| EP | 0993316 | 8/1999 |
| EP | 1284229 | 2/2002 |
| EP | 1323651 | 7/2003 |
| WO | WO97/45341 | 12/1997 |

* cited by examiner

STORAGE SYSTEM FOR GLASS OFFCUT

CROSS RELATED APPLICATION

The present application is a continuation in part of U.S. patent application Ser. No. 10/798,326 filed Mar. 12, 2004 now U.S. Pat. No. 7,217,077, the content of which is hereby incorporated by reference.

BACKGROUND

Flat glass parts included in items such as windows, curtain walls, mirrors or any similar articles are almost always cut from large glass panes. A typical dimension for these large glass panes is 96 inches by 144 inches, other dimensions being also used as well. The smaller glass sections are cut from the large glass panes according to calculated patterns in order to obtain a maximum use thereof. A computer is used for optimizing the cutting patterns. The goal is usually to reach an efficiency ratio of at least 92% of the surface area of each original glass pane. With such yield, the glass offcuts are usually too small to be useful and are simply sent to a bin for glass material recycling.

There is a very wide range of different glass panes on the market to fulfill the needs of customers. Glass panes can have different thicknesses, colors, resistances, hard and soft coatings, etc. Some production lines are thus supplied with different types of glass panes every day to process various orders from their customers. This situation is usually that of commercial window manufacturers. For instance, when manufacturing windows for a new building, a number of glass sections will have to be cut from several large glass panes. However, once the order is completed, the last one of the large glass panes is often used only partially, thus less than the usual 92% efficiency ratio goal. Another section of this specific glass offcut may not be required again for several weeks or even months.

When the glass offcut is relatively small, for instance 36 inches by 48 inches, two workers can remove it from the production line and store it on a rack until it is needed again. However, in the case of a large glass offcut, for instance a section of 36 inches by 72 inches, the handling by hand is generally considered too dangerous to be undertaken. This is why these large offcuts are currently cut into smaller parts to ease their manipulation by hand. The drawback of these smaller parts is that they will be useless if they are smaller than what is needed. Yet, even if someone is able to remove large glass offcuts from a production line, inadequate manipulation and storage may destroy their value. For instance, many glass panes have a soft coating on one side. This soft coating will eventually be located inside a window or a mirror once the glass item is assembled. Meanwhile, the exposed surface is very sensitive to scratches or dust. Storing glass offcuts one against another or horizontally may damage the soft coating. Also, it may be difficult to maintain a constant inventory of sections still available.

For all these reasons, it is usually simpler for operators to throw all glass offcuts into a recycle bin and send the bin offsite for material recycling. This of course decreases the yield and thus the profits. For customers, it increases the costs and delay for replacing one window in the future. If a customer wants to replace a window with a particular kind of glass, a new large glass pane will need to be ordered and manufactured in accordance to the specifications, shipped to the processing plant and then cut. Its own offcut will most probably be destroyed thereafter.

There is clearly a need for an improved storage system for glass offcuts and a new method for storing glass offcuts. There is also a need for a method of recycling glass offcuts, namely being able to reuse them at a later time.

SUMMARY

In accordance with an aspect, there is provided a storage system for glass offcuts, the storage system being provided on one side of a glass processing line having a loading table, a glass cutting table and a breakout table, the storage system comprising: a first tilt table, the first tilt table having a front side and a rear side, the front side being adjacent to the breakout table; a second tilt table, the second tilt table having a front side and a rear side, the front side being adjacent to the loading table; an intermediary glass offcut conveyor extending parallel to the glass processing line, the intermediary conveyor having one end in registry with the rear side of the first tilt table and a second end in registry with the rear side of the second tilt table; a laterally-movable glass offcut conveyor having a proximal portion and a distal portion, the laterally-movable conveyor extending in a direction parallel to the intermediary conveyor, the proximal portion of the laterally-movable conveyor being adjacent to and located on a side of the first or the second tilt table that is opposite the intermediary conveyor; and a storage rack positioned over the distal portion of the laterally-movable conveyor, the storage rack having a plurality of slot dividers defining a plurality of parallel storage slots extending parallel to the laterally-movable conveyor, the storage slots individually storing the glass offcuts at a substantially vertical position of less than 90 degrees with reference to the horizontal.

In accordance with another aspect, there is provided a method of recycling an initially useless glass offcut from a glass processing line, the method comprising: individually receiving the glass offcut from a breakout table of the glass processing line; pivoting the glass offcut from a horizontal position to a substantially vertical position of less than 90 degrees with reference to the horizontal; moving the glass offcut using conveyors while still at the substantially vertical position of less than 90 degrees with reference to the horizontal, to a selected individual storage location; storing the glass offcut in the substantially vertical position of less than 90 degrees with reference to the horizontal; upon determining that the glass offcut is required back to the glass processing line, moving the glass offcut out of the individual storage location; pivoting the glass offcut back to the horizontal position; and moving the glass offcut to a loading table of the glass processing line.

The details of these and also other aspects of the improved storage system are provided in the following detailed description, which is made with reference to the accompanying figures that are briefly described hereafter.

DETAILED DESCRIPTION

An example of an improved storage system (10) is described hereinafter and illustrated in the appended figures. A method of storing one or more glass offcuts, and a method of recycling one or more glass offcuts are also disclosed. It must be noted that various changes and modifications may be effected therein without departing from the scope conferred by the appended claims.

Figure 1:
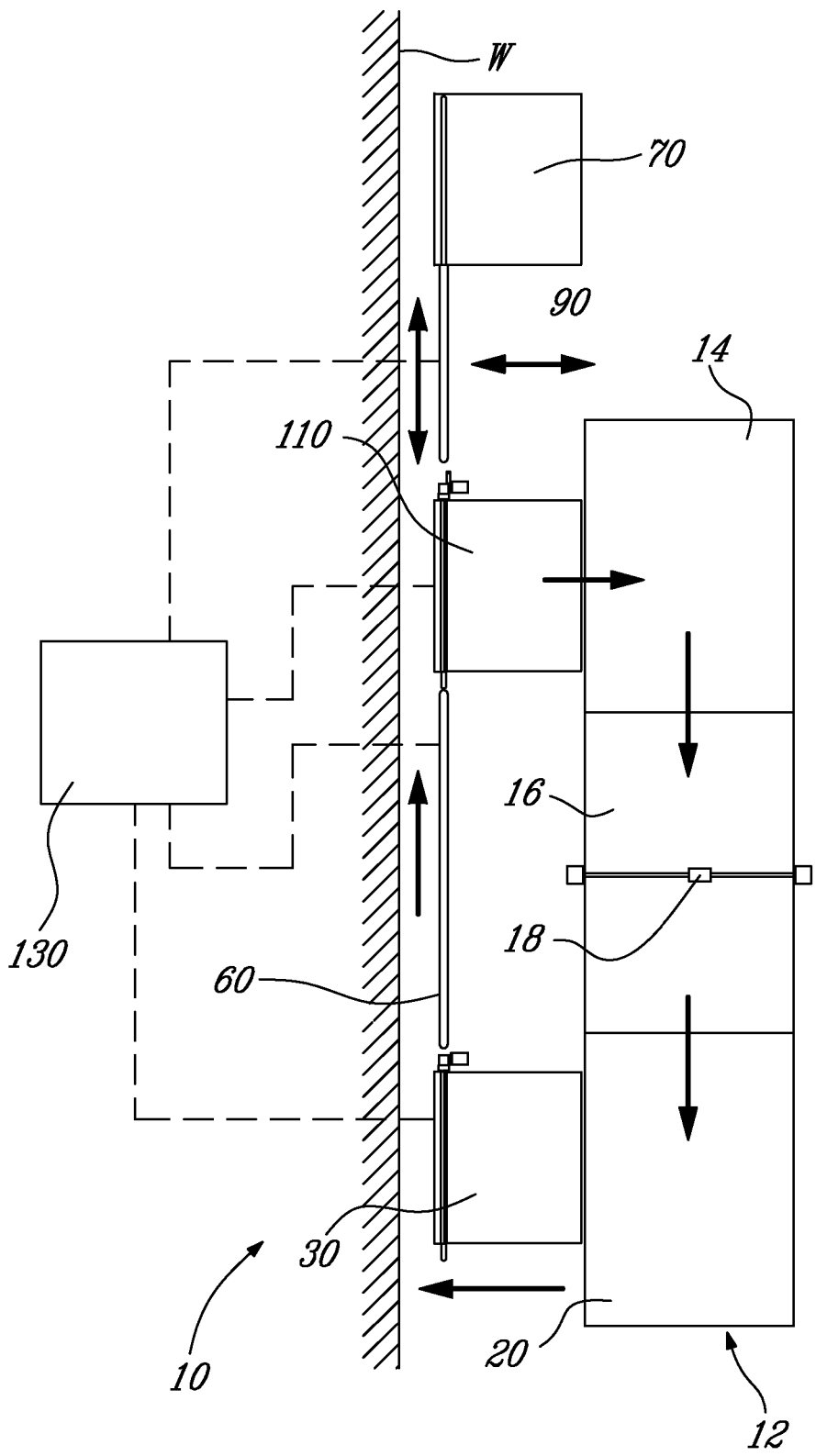
FIG. 1 is a schematic top plan view of an example of an improved storage system located next to a flat glass processing line.

Referring first to FIG. 1, there is shown an example of a flat glass processing line (12) on the side of which a storage system (10) is installed. The processing line (12) comprises a loading table (14) where horizontally disposed glass panes are provided, a glass cutting table (16), including a computer-controlled glass cutting tool (18), and a breakout table (20) located downstream the glass cutting table (16). The breakout table (20) is the location where glass sections cut from a large glass pane are detached to be sent elsewhere in the plant for further processing. The storage system (10) is used for the glass offcuts which are large enough to be eventually recycled back to the processing line. The illustrated arrows in solid lines in FIG. 1 denote the normal possible direction of travel of glass panes and their offcuts to be recycled.

The storage system (10) comprises a first tilt table (30), an intermediary glass offcut conveyor (60), a second tilt table (110), a laterally-movable glass offcut conveyor (90) and a storage rack (70). The storage rack (70) is the location where the glass offcuts (G) will be stored until they are needed. The various motors and actuators of these parts are controlled by a computer (130) or using any other suitable kind of control scheme.

Figure 2:
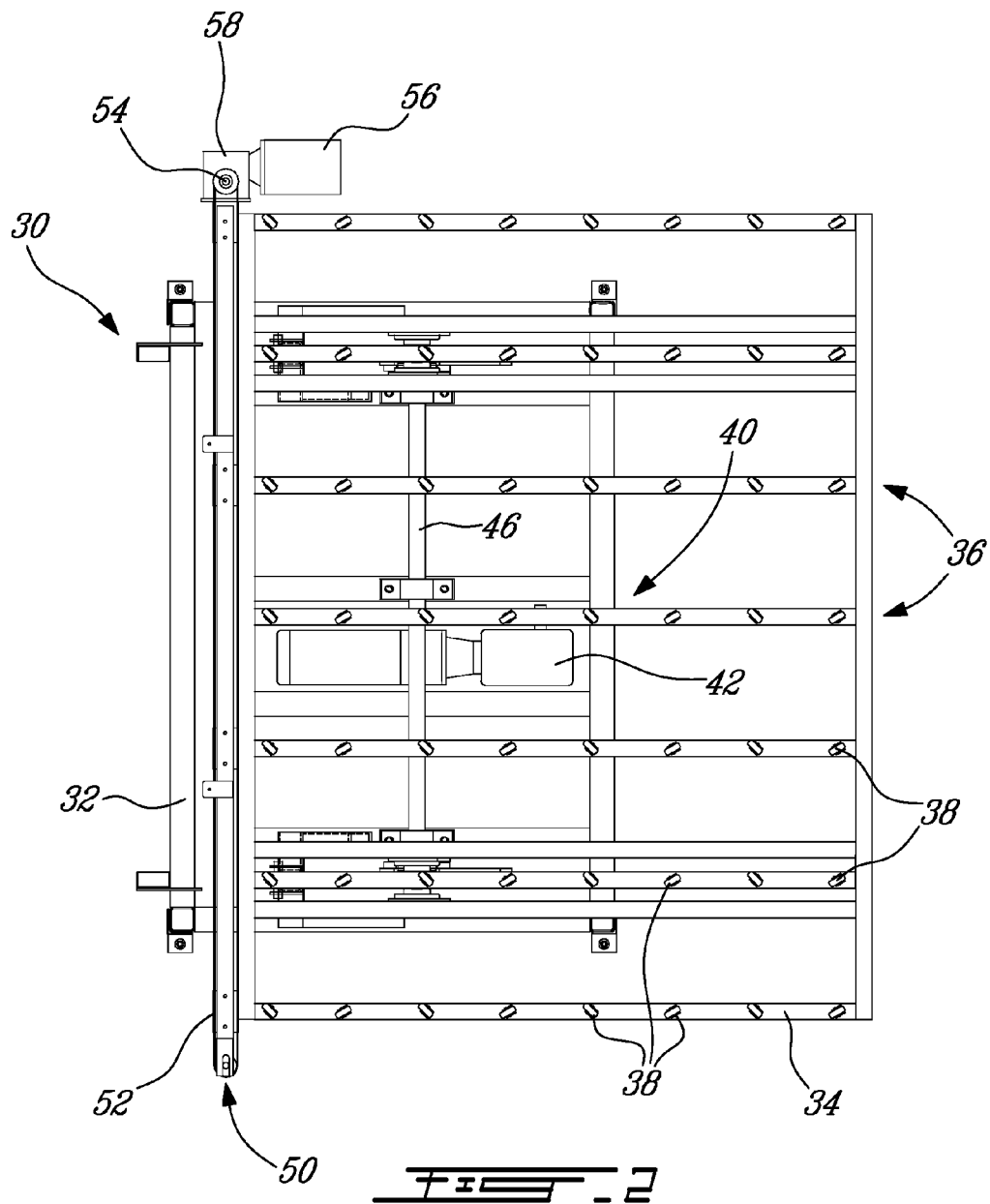
FIG. 2 is a top plan view of the first tilt table used in the storage system of FIG. 1.
Figure 3:
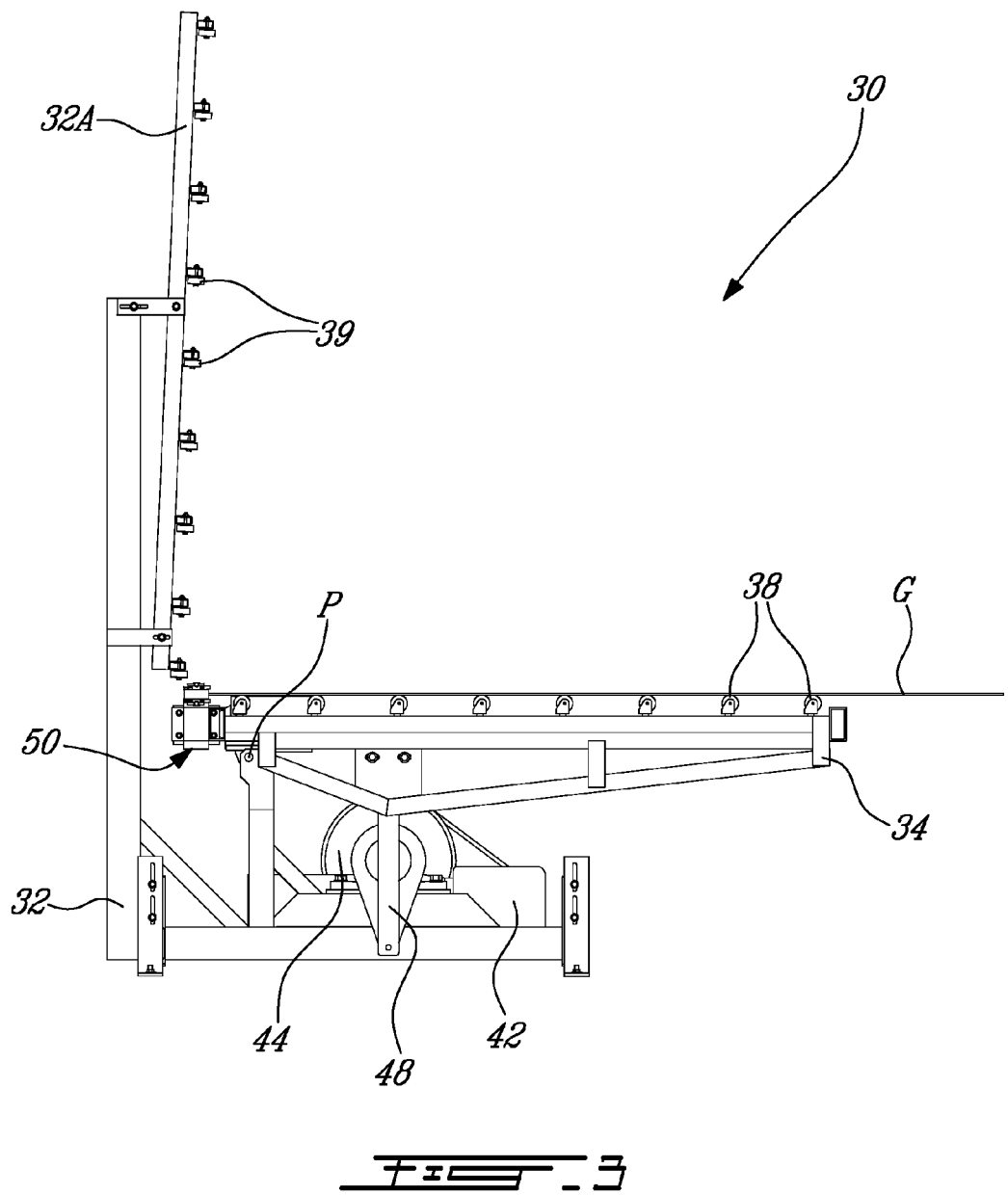
FIG. 3 is a side elevation view of the first tilt table used in the storage system of FIG. 1, showing its movable frame in the horizontal position.
Figure 4:
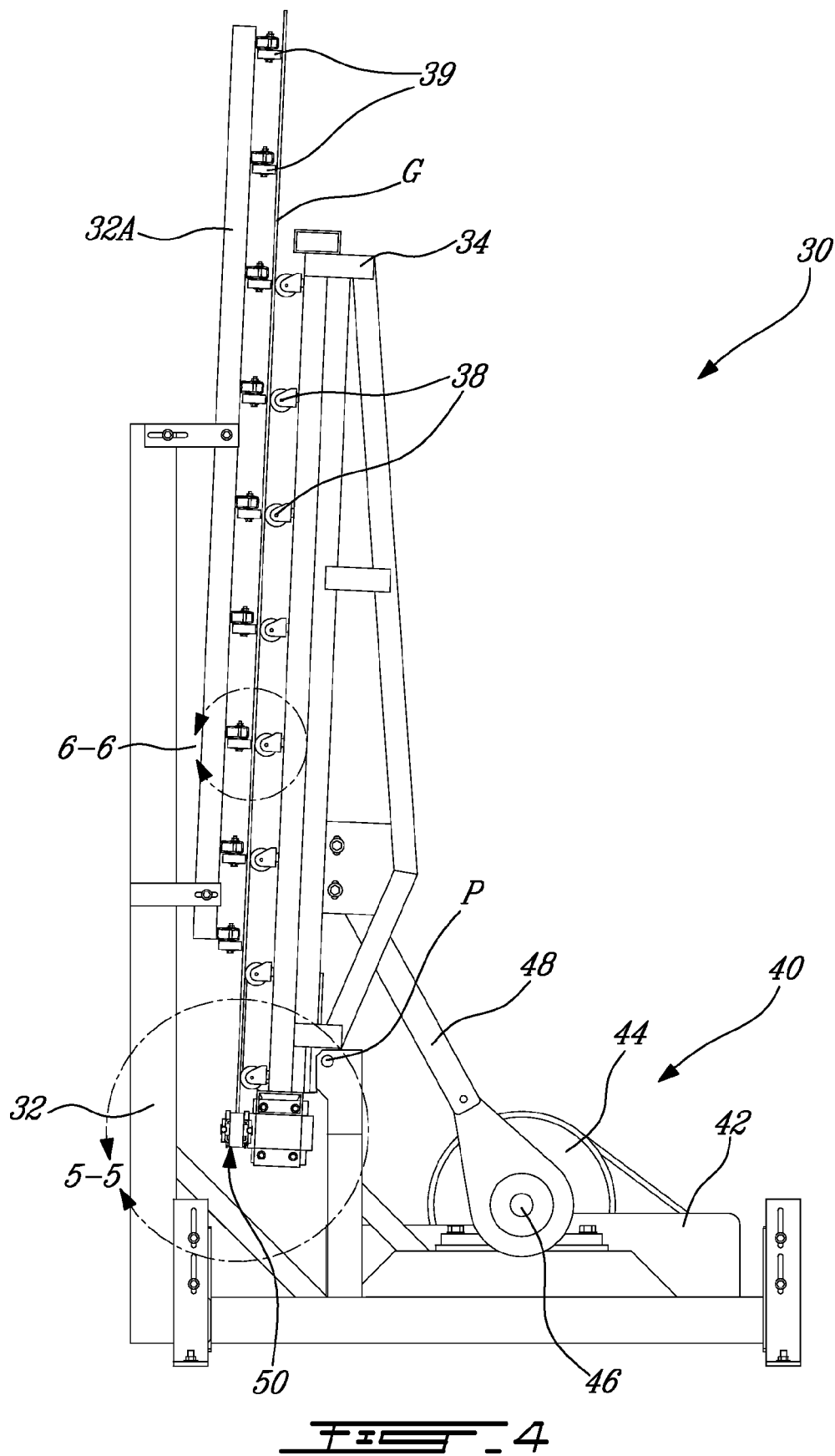
FIG. 4 is a view similar to FIG. 3, showing the movable frame of the first tilt table in the substantially vertical position.

As shown in FIGS. 2 to 4, the first tilt table (30) comprises a main frame (32), secured to the floor, and a movable frame (34) pivotally connected to the main frame (32). The first tilt table (30) is configured and disposed so that it is possible to horizontally convey a glass offcut (G), usually pushed by hand, from the breakout table (20) to the upper part of its movable frame (34). The movable frame (34) comprises a glass supporting assembly (36) on an upper part thereof, namely the upper part when the movable frame (34) is horizontal. This assembly (36) can include a plurality of caster wheels (38) or an air cushion created using an appropriate hardware (not shown). Other techniques can also be used as well. The main frame (32) also includes a fixed vertically-extending portion (32A) provided with a plurality of rollers (39).

FIGS. 3 and 4 shows that the movable frame (34) is movable around a pivot axis (P) between a horizontal position and a substantially vertical position of less than 90 degrees with reference to the horizontal. FIG. 3 shows the movable frame (34) in the horizontal position and FIG. 4 shows the movable frame (34) in the substantially vertical position. A tilt mechanism (40) is provided between the main frame (32) and a movable frame (34) of the first tilt table (30). It comprises a motor (42) mechanically connected to a pulley assembly (44), itself mechanically connected to a drive shaft (46) and to articulated levers (48).

A motor-driven supporting unit (50) is mounted on the movable frame (34) of the first tilt table (30). When the movable frame (34) is horizontal, the supporting unit (50) acts as a stop at the end of the movable frame (34). The supporting unit (50) is configured and disposed to move the glass offcut (G) lengthwise when the movable frame (34) is at the substantially vertical position, as shown in FIG. 4.

Figure 5:
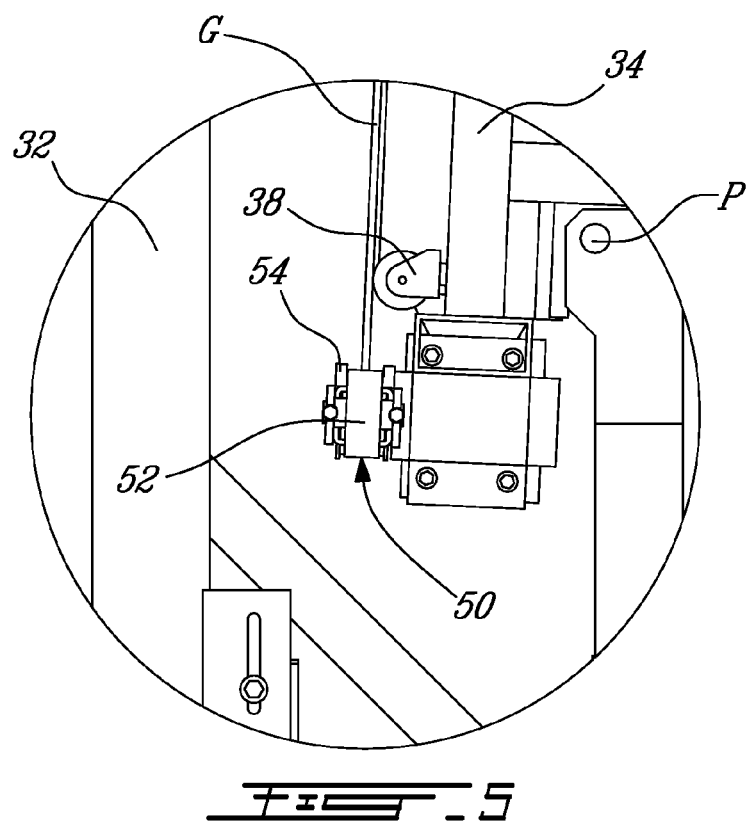
FIG. 5 is an enlarged side view of the bottom of the glass offcut in the vertical position and resting on the conveyor unit of the first tilt table of FIG. 4.

As best shown in FIG. 5, the bottom of the glass offcut (G) rests on the supporting unit (50) when oriented at the substantially vertical position. This supporting unit (50) allows carrying the glass offcut (G) towards the intermediary conveyor (60). The supporting unit (50) comprises an endless belt (52), for instance made of polyurethane, supported by a set of pulleys (54) and driven by an electrical motor (56) connected to a gearbox (58), as shown in FIG. 2. The glass offcut (G) will be moved lengthwise, thus in its longitudinal direction. Other kinds of supporting units (50) can be used as well.

Figure 6:
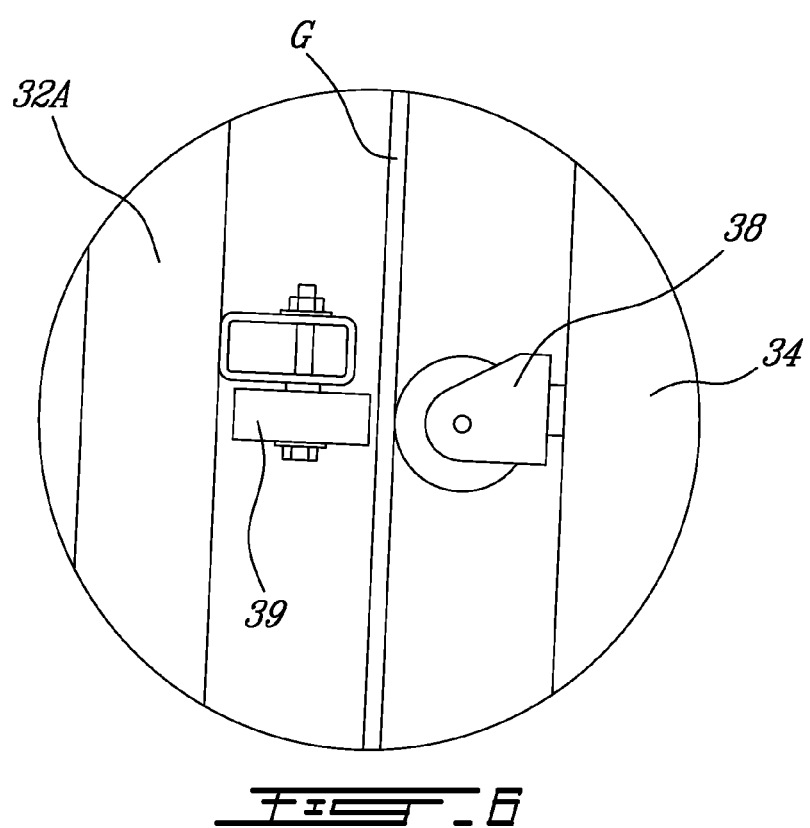
FIG. 6 is an enlarged side view of the glass offcut of FIG. 4 at an intermediary location.

FIG. 6 shows that the glass offcut (G) does not contact the rollers (39) located on the vertically extending portion (32A) of the main frame (32) of the first tilt table (30). This vertically extending portion (32A) and its rollers (39) are only provided in case something moves the glass offcut (G) out of engagement with the movable frame (34), such as if a wind gust enters the building. One advantage of having only one main face of the glass offcut (G) being supported is that the other side will not be damaged by any part of the storage system (10), especially if made of a soft coating since it will always remain out of engagement with something.

Figure 7:
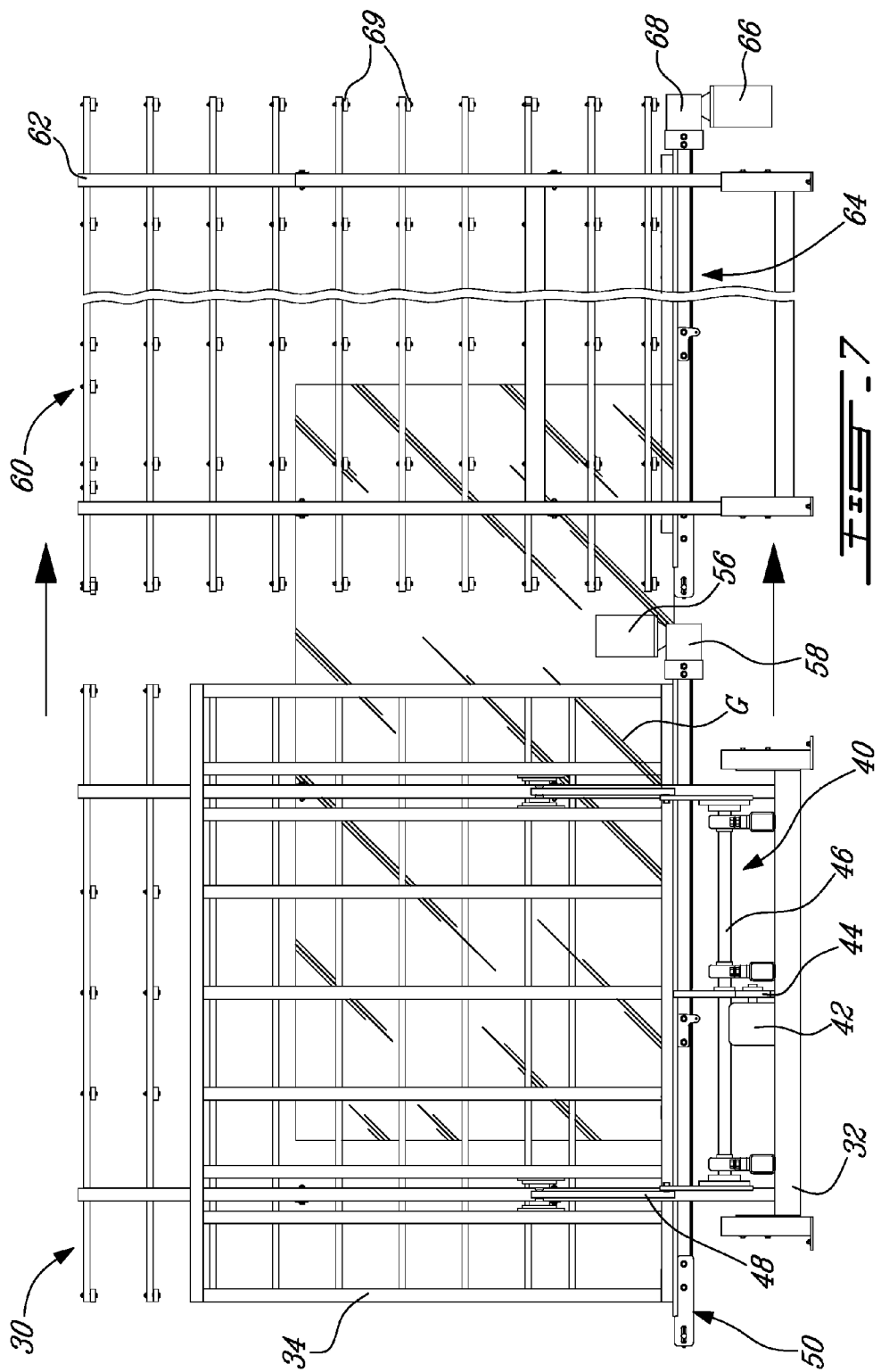
FIG. 7 is a front view illustrating the transition of the glass offcut from the first tilt table to the intermediary conveyor used in the storage system of FIG. 1.

FIG. 7 shows the transition of the glass offcut (G) from the first tilt table (30) to the intermediary conveyor (60). This intermediary conveyor (60) extends parallel to the glass processing line (12), between the rear end of the first tilt table (30) and rear end of the second tilt table (110). This intermediary conveyor (60) comprises a double-sided fixed frame (62) with a belt-type supporting unit (64) driven by a motor (66) connected to a gearbox (68). The front side of the main frame (62) is oriented in accordance with the substantially vertical position of less than 90 degrees with reference to the horizontal. Rollers (69) are used to laterally support the glass offcut.

Figure 8:
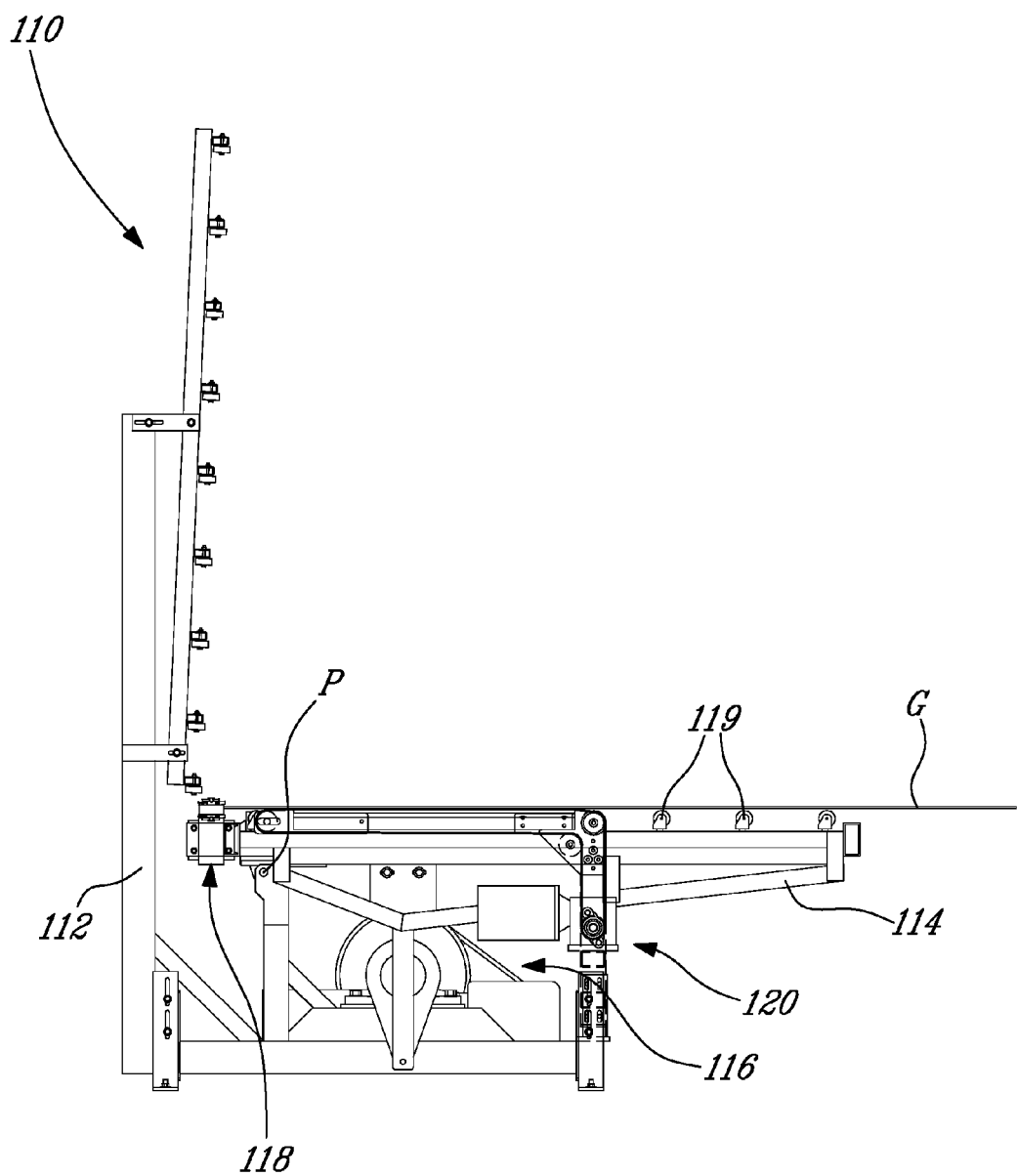
FIG. 8 is a side view of the second tilt table used in the storage system of FIG. 1, showing its movable frame in the horizontal position.
Figure 13:
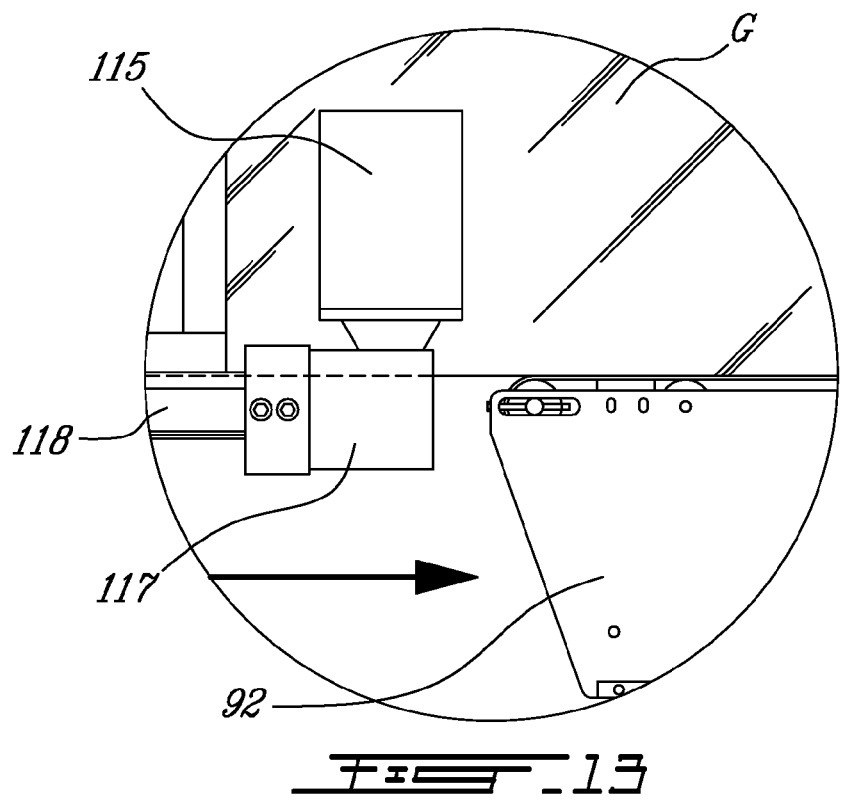
FIG. 13 is an enlarged front view showing the transition of the glass offcut between the second tilt table and the laterally-movable conveyor.

The second tilt table (110) is somewhat similar to the first tilt table (30), as shown in FIG. 8. It comprises a main frame (112) and a movable frame (114), the movable frame (114) being movable around a pivot axis (P) between a substantially vertical position of less than 90 degrees with reference to the horizontal, and the horizontal. It comprises a glass supporting assembly, using for instance caster wheels (119). A tilt mechanism (116) allows moving the movable frame (114) with reference to the main frame (112). A motor-driven supporting unit (118) is connected to the movable frame (114). This supporting unit (118) of the second tilt table (110) is configured and disposed to move glass offcuts (G) when the movable frame (114) of the second tilt table (110) is at the substantially vertical position. It is driven by a motor (115) mechanically connected to the belt of the supporting unit (118) by a gearbox (117), as shown in FIG. 13.

In the illustrated embodiment, as shown in FIG. 8, the second tilt table (110) comprises at least two spaced-apart transversal horizontal belt conveyors (120) configured and disposed to support a glass offcut (G) above the movable frame (114) thereof, when positioned at the horizontal position, and to convey the glass offcut (G) transversally back to the loading table (14). When the movable frame (114) is horizontal, the glass offcut (G) does not contact the caster wheels (119) anymore.

The laterally-movable conveyor (90) comprises a proximal portion and a distal portion with reference to the second tilt table (110). The proximal portion comprises a double-sided fixed frame (91) similar to that of the intermediary conveyor (60). The double-sided fixed frame (91) maintains the glass offcut (G) before it is stored into the storage rack (110). The length of the proximal portion of the laterally-movable conveyor (90) is equal or longer to the maximum length of the glass offcut (G) to be stored in the storage rack (70).

Figure 9:
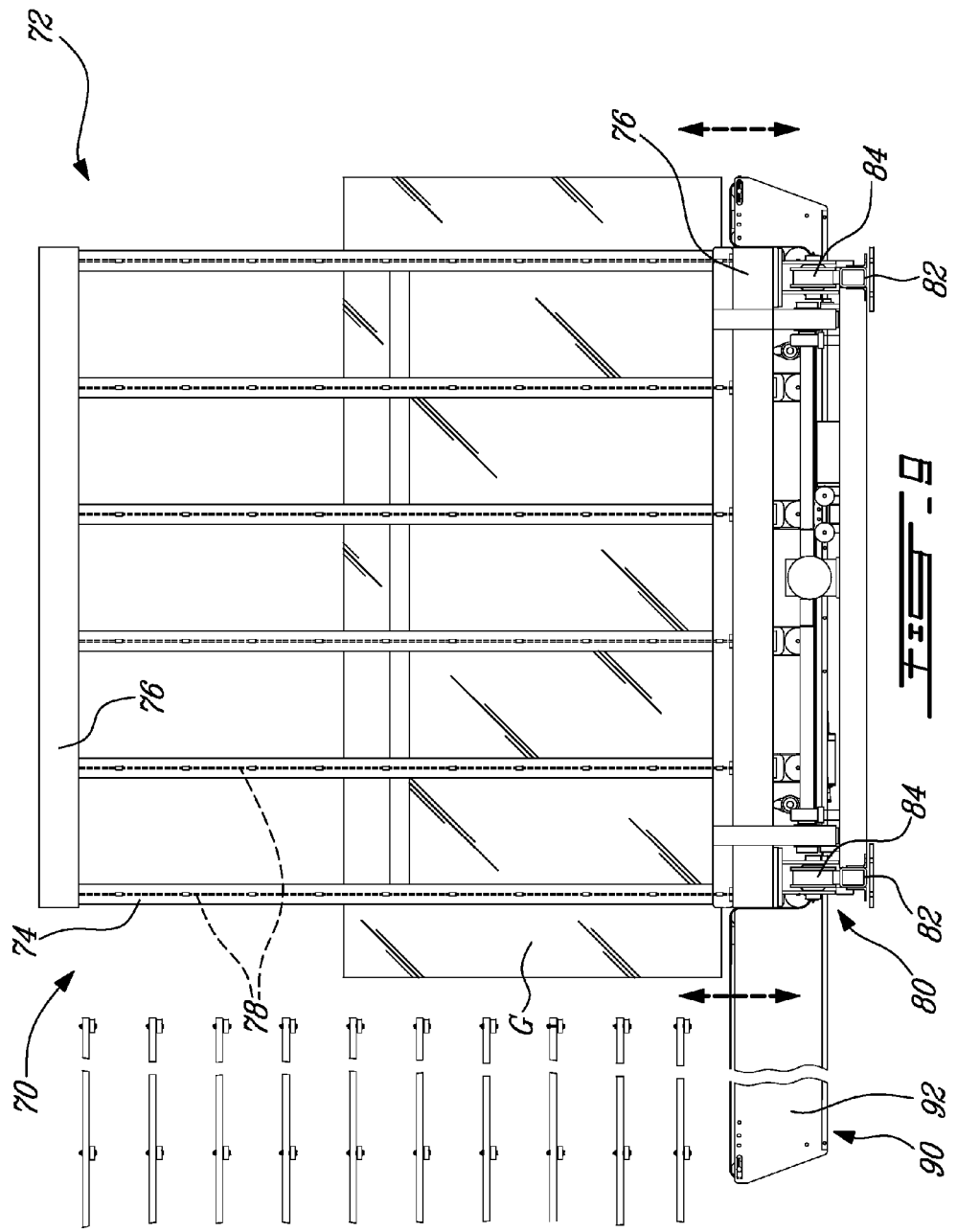
FIG. 9 is a front view of the laterally-movable conveyor and the storage rack used in the storage system of FIG. 1.
Figure 10:
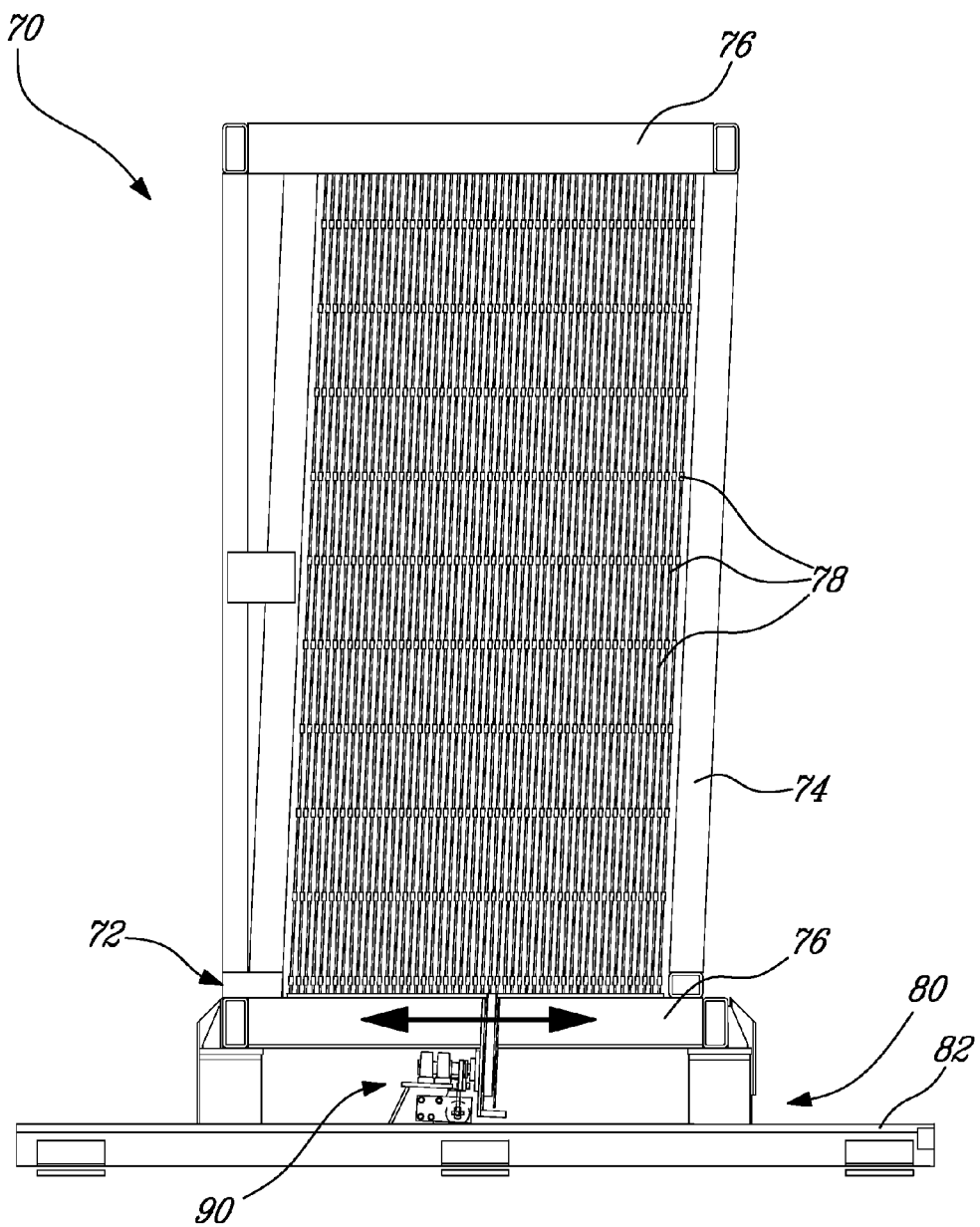
FIG. 10 is a side view of the laterally-movable conveyor and the storage rack shown in FIG. 9.
Figure 11:
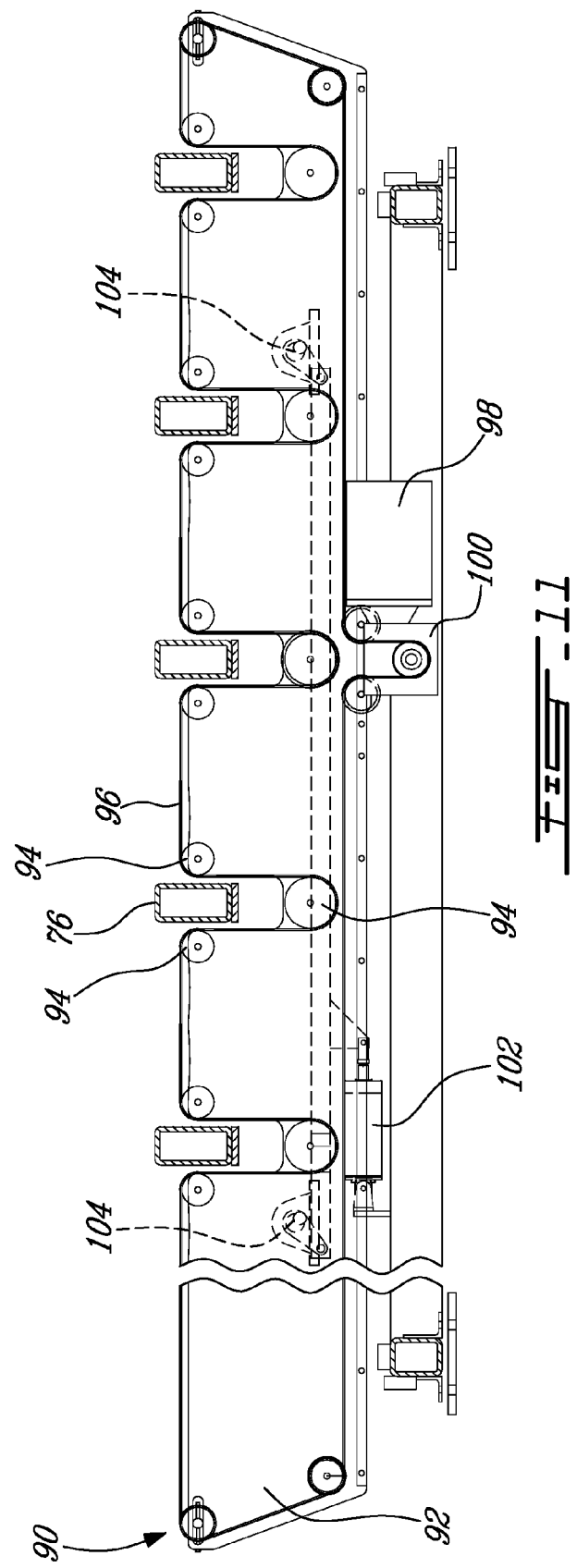
FIG. 11 is an enlarged front view of the distal portion of the laterally-movable conveyor of FIG. 9.
Figure 12:
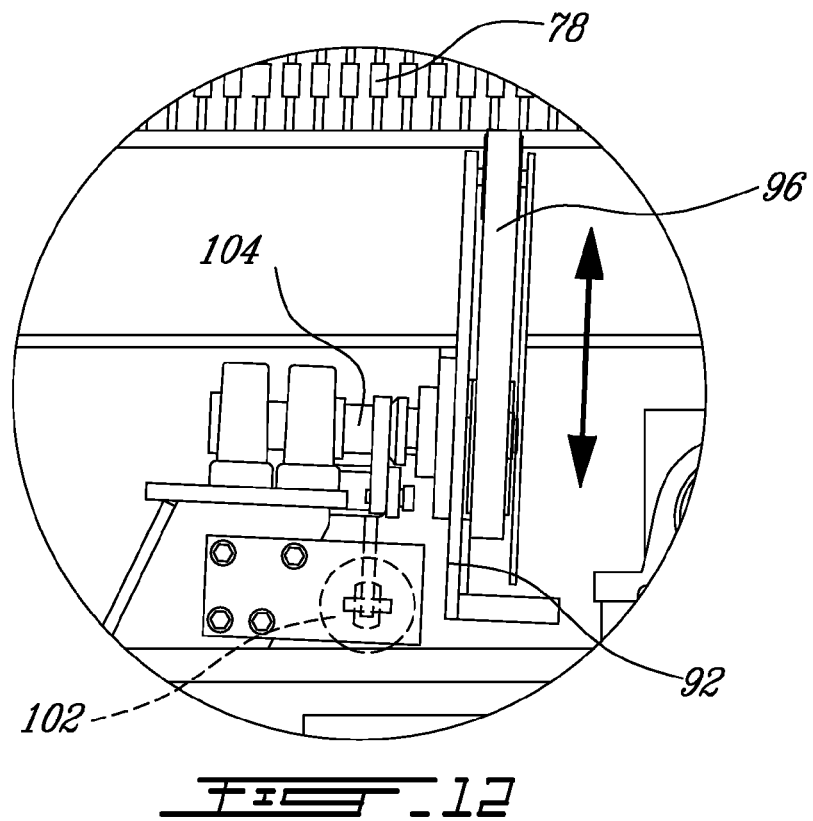
FIG. 12 is an enlarged side view of the laterally-movable conveyor of FIG. 10.

The storage rack (70) is illustrated in FIGS. 9 and 10. It comprises a main frame (72) made of a plurality of horizontal and vertical beams (74,76). The main frame (72) is rigidly secured to the ground or otherwise fixed to the ground. Within these beams (74,76) are located a plurality of parallel storage slot dividers (78) which are configured and disposed to provide a plurality of slots extending longitudinally within the main frame (72) of the storage rack (70). These storage slots are used to individually store glass offcuts (G) in the substantially vertical position of less than 90 degrees with reference to the horizontal. The glass offcuts (G) will be individually stored therein, namely that their main faces will not touch another glass offcut. The illustrated storage slot dividers (78) are in the form of a plurality of relatively thin wires or rods provided with small rollers, the rods being disposed in rows extending from the top of the main frame (72) to its bottom. Glass offcuts (G) enter the storage slots from one side and exit the storage slots from the same side.

The laterally-movable conveyor (90) is mounted on a carriage unit (80). The carriage unit (80) is configured and disposed to laterally move the conveyor (90) into alignment with a selected storage slot of the storage rack (70). This way, a glass offcut (G) to be stored can be moved into any one of the storage slots. The illustrated carriage unit (80) comprises two or more parallel rails (82), secured to the floor, and a plurality of wheels (84) mounted on the rails (82). At least one actuator, linear or rotational, is used to displace the conveyor (90) on the rails (82). This design provides a very compact arrangement, although other arrangements are also possible.

The laterally-movable conveyor (90) also comprises a frame (92) connected to the upper side of the carriage unit (80). The frame (92) supports a plurality of pulleys (94) around which a conveyor belt (96) is provided. A motor (98) is mechanically connected to the conveyor belt (96) through a gearbox (100). At least one pneumatic actuator (102) is configured and disposed to selectively move the conveyor frame (92) between a raised position and a lower position. Activating the actuator (102) forces the conveyor frame (92) to pivot around a set of pivots (104) and the frame (92) is moved upward in the last portion of the stroke.

In the illustrated embodiment, the pulleys (94) in the distal portion of the conveyor (90) are configured and disposed to shape the conveyor belt (96) in a zigzag pattern under the storage rack (70). This allows the upper portion of the conveyor belt (96) to be raised between lower beam members of the main frame (72) of the storage rack (70).

Each storage slot has a bottom supporting area being slightly higher than the upper portion of the conveyor belt (96) of the conveyor (90) when the actuator (102) is not activated. In use, in the illustrated storage system (10), the glass offcut (G) is conveyed at the same level from the second tilt table (110). Then, when the conveyor (90) is raised, the bottom of the glass offcut (G) will be slightly above the upper surface of the bottom supporting beams (76). Lowering the actuator (102) brings the bottom of the glass offcut (G) on the beams (76). They are preferably provided with protector members, for instance rubber or foam pieces, to avoid damaging the bottom of the glass offcut (G). The fact that the bottom of the glass offcuts (G) is higher that the conveyor belt (96) in its lower position allows the conveyor (90) to be freely moved laterally under the main frame (72) of the storage rack (70).

The substantially vertical positions referred to earlier is preferably an angle between 85° and 88° with reference to the horizontal. This range of angles has been found to avoid the upper main face of a horizontally-disposed glass offcut (G) to make contact with any part of the storage system (10) when tilted near the vertical and conveyed through it. The exact tilt angle can be slightly different between the first tilt table (30), the intermediary conveyor (60), the second tilt table (110), the laterally-movable conveyor (90) and the storage slot dividers (68). In practice, the tilt angle is the same throughout the system (10).

A computer (130) is used to control the sequence of operations, as schematically shown in FIG. 1. The computer (130) includes connections to the various motors and actuators. It can also comprise a database to record information on each glass offcut (G) stored therein. This section of the computer (130) may be interfaced with another computer or section of the computer (130) that controls the supply of new glass panes. If it detects that one stored glass offcut (G) can be used, it can send a signal to that effect and eventually instruct the storage system (10) to send the selected glass offcut (G) back to the loading table (14) of processing line (12).

As can be appreciated, the storage system (10) is able to undertake a new method of storing a glass offcut next to a glass processing line. In accordance with this method, the glass offcut is received from a breakout table and is then pivoted from a horizontal position to a substantially vertical position of less than 90 degrees with reference to the horizontal. From there, it is longitudinally conveyed, at the substantially vertical position, to an individual storage location. The glass offcut is finally stored in the substantially vertical position. Later, upon determining that one glass offcut is required from the storage location, the glass offcut is longitudinally conveyed backward, still at the substantially vertical position, out of its individual storage location. It is then pivoted to a horizontal position just before conveyed to the loading table.

A new method of recycling glass offcuts is also provided. In accordance with this method, an individual glass offcut is first received from a breakout table. It is pivoted from a horizontal position to a substantially vertical position of less than 90 degrees with reference to the horizontal. Then, it is longitudinally conveyed, still at the substantially vertical position, to an individual storage location. Upon determining that the glass offcut is required, the glass offcut can be longitudinally conveyed out of the individual storage location. It is pivoted to a horizontal position and then moved to a loading table.

It should be noted that, the laterally-movable conveyor (90) and the storage rack (70) can be provided at either ends of the storage system (10), namely at the end of the second tilt table (110), as shown, or at the end of the first tilt table (30), on the side opposite that of the intermediary conveyor (60). In both cases, one advantage of this storage system (10) is that it can be designed to be installed close to a wall (W), as shown in FIG. 1. Of course, many other changes can be made to the storage system illustrated in the figures.

What is claimed is:

1. A method of recycling an initially useless glass offcut from a glass processing line, the method comprising:

individually receiving the glass offcut from a breakout table downstream of a glass cutting table in the glass processing line;

pivoting the glass offcut from a horizontal position to a substantially vertical position of less than 90 degrees with reference to the horizontal;

moving the glass offcut using conveyors while still at the substantially vertical position of less than 90 degrees with reference to the horizontal, to a selected individual storage location;

storing the glass offcut in the substantially vertical position of less than 90 degrees with reference to the horizontal;

upon determining that the glass offcut is required back to the glass processing line, moving the glass offcut out of the individual storage location;

pivoting the glass offcut back to the horizontal position; and moving the glass offcut to a loading table upstream of the glass cutting table in the glass processing line for subsequently cutting the glass offcut at the glass cutting table.

2. The method according to claim 1, wherein the substantially vertical position defines an angle between 85° and 88° with reference to the horizontal.

3. The method according to claim 1, wherein moving the glass offcut in and out of the storage location includes laterally moving the glass offcut immediately before or after it is stored in the storage location.

4. The method according to claim 1, wherein the glass offcut constantly remains substantially parallel to the glass processing line.

5. The method according to claim 1, wherein the glass offcut is moved longitudinally and laterally using the conveyors, the selected individual storage location being in a fixed storage rack.

* * * * *